(12) United States Patent
Kim et al.

(10) Patent No.: US 11,773,965 B1
(45) Date of Patent: Oct. 3, 2023

(54) METHOD AND APPARATUS FOR CALCULATING DEGRADATION DEGREE OF A DAMPER CLUTCH OF AN AUTOMATIC TRANSMISSION OF A VEHICLE

(71) Applicants: HYUNDAI MOTOR COMPANY, Seoul (KR); KIA CORPORATION, Seoul (KR); Seoul National University of Science & Technology, Foundation for Research & Business, Seoul (KR)

(72) Inventors: Ji hoon Kim, Suwon-si (KR); Won Sik Lim, Seoul (KR); Jae Hyeon Park, Seoul (KR)

(73) Assignees: HYUNDAI MOTOR COMPANY, Seoul (KR); KIA CORPORATION, Seoul (KR); Seoul National University of Science & Technology, Foundation for Research & Business, Seoul (KR)

( * ) Notice: Subject to any disclaimer, the term of this patent is extended or adjusted under 35 U.S.C. 154(b) by 0 days.

(21) Appl. No.: 17/984,821

(22) Filed: Nov. 10, 2022

(30) Foreign Application Priority Data

Sep. 2, 2022 (KR) .......................... 10-2022-0111150

(51) Int. Cl.
*F16H 61/00* (2006.01)
*F16H 61/02* (2006.01)
(Continued)

(52) U.S. Cl.
CPC .......... *F16H 61/0293* (2013.01); *F16H 59/68* (2013.01); *F16H 61/12* (2013.01);
(Continued)

(58) Field of Classification Search
CPC ...... F16H 61/0293; F16H 59/68; F16H 61/12; F16H 2061/009; F16H 2061/1216; F16H 2061/1276
See application file for complete search history.

(56) References Cited

U.S. PATENT DOCUMENTS

2018/0202379 A1* 7/2018 Nagashima .......... F02D 41/1497
2019/0048969 A1* 2/2019 Lee ......................... F16H 61/12
(Continued)

FOREIGN PATENT DOCUMENTS

DE 4333145 A1 * 3/1994 ............. G05D 19/02

*Primary Examiner* — Justin Holmes
(74) *Attorney, Agent, or Firm* — LEMPIA SUMMERFIELD KATZ LLC

(57) ABSTRACT

A method for calculating a degradation degree of a damper clutch of an automatic transmission of a vehicle includes: filtering, by a controller, a vibration signal of the vehicle according to driving of the vehicle in order to remove a vibration signal of the vehicle corresponding to a natural frequency of an engine of the vehicle from the vibration signal of the vehicle according to the driving of the vehicle; converting, by the controller, the filtered vibration signal into a signal including a sinusoidal wave having a natural frequency of the automatic transmission based on a gear stage of the automatic transmission of the vehicle by using a frequency analysis method; and calculating, by the controller, a degradation degree of the damper clutch included in a torque converter of the automatic transmission based on a magnitude of the sinusoidal wave having the natural frequency of the automatic transmission.

8 Claims, 2 Drawing Sheets

(51) Int. Cl.
  *F16H 59/68*  (2006.01)
  *F16H 61/12*  (2010.01)
(52) U.S. Cl.
  CPC ................ *F16H 2061/009* (2013.01); *F16H 2061/1216* (2013.01); *F16H 2061/1276* (2013.01)

(56) References Cited

U.S. PATENT DOCUMENTS

2020/0331454 A1* 10/2020 An .................. G01M 15/12
2021/0086776 A1* 3/2021 Park .................. B60K 17/02

* cited by examiner

METHOD AND APPARATUS FOR CALCULATING DEGRADATION DEGREE OF A DAMPER CLUTCH OF AN AUTOMATIC TRANSMISSION OF A VEHICLE

CROSS-REFERENCE TO RELATED APPLICATION

This application claims priority to and the benefit of Korean Patent Application No. 10-2022-0111150, filed in the Korean Intellectual Property Office on Sep. 2, 2022, the entire contents of which are incorporated herein by reference.

BACKGROUND

(a) Field

The present disclosure relates to an automatic transmission of a vehicle. More particularly, the present disclosure relates to a method and apparatus for calculating degradation degree of a damper clutch of an automatic transmission of a vehicle.

(b) Description of the Related Art

In general, a torque converter transmits a driving torque of an engine of a vehicle to an automatic transmission using a fluid. Such a torque converter includes an impeller that rotates by receiving the driving torque of the engine, a turbine that is rotated by oil discharged from the impeller, and a reactor (also called a stator) that increases the torque transmission rate by directing the flow of oil returned to the impeller in the rotational direction of the impeller.

The torque converter includes a damper clutch that directly connects the engine and the transmission such that the torque of the engine may be directly transmitted to the transmission. The damper clutch is disposed between the turbine and a front cover connected to the engine such that the torque of the engine may be directly transmitted to the turbine.

Such a damper clutch includes a piston axially movably coupled to a turbine shaft. In addition, a friction material in friction contact with the front cover is coupled to the piston. Furthermore, the damper clutch includes a torsional damper capable of absorbing shock and vibration acting in the rotational direction of the shaft when the friction material coupled to the piston is coupled to the front cover.

When the damper clutch starts to operate, the friction material adheres to the front cover and generates high heat. Due to the high heat generated at this time, the oil in the torque converter may be rapidly deteriorated and the durability of the friction material may be deteriorated.

The above information disclosed in this Background section is provided only to enhance understanding of the background of the disclosure. Therefore, it may contain information that does not form the prior art that is already known to a person of ordinary skill in the art.

SUMMARY OF THE PRESENT DISCLOSURE

The present disclosure provides a method and apparatus for calculating degradation degree of a damper clutch of an automatic transmission of a vehicle that is capable of calculating a degradation degree of a damper clutch of an automatic transmission of a vehicle by using a vibration signal of the vehicle according to driving of the vehicle.

In one embodiment of the present disclosure, a method for calculating a degradation degree of a damper clutch of an automatic transmission of a vehicle includes: filtering, by a controller, a vibration signal of the vehicle according to driving of the vehicle in order to remove a vibration signal of the vehicle corresponding to a natural frequency of an engine of the vehicle from the vibration signal of the vehicle according to driving of the vehicle. The method further includes: converting, by the controller, the filtered vibration signal into a signal including a sinusoidal wave having a natural frequency of the automatic transmission based on a gear stage of the automatic transmission of the vehicle by using a frequency analysis method. The method further includes: calculating, by the controller, a degradation degree of the damper clutch included in a torque converter of the automatic transmission based on a magnitude of the sinusoidal wave having the natural frequency of the automatic transmission.

The controller may be configured to filter the vibration signal of the vehicle according to driving of the vehicle by using a high pass filter.

The frequency analysis method may include a fast Fourier transform method.

The method may further include displaying, by the controller, the degradation degree of the damper clutch through a display device.

In another embodiment of the present disclosure, an apparatus for calculating a degradation degree of a damper clutch of an automatic transmission of a vehicle includes: a data detector configured to detect a vibration signal of the vehicle according to driving of the vehicle, and a controller. In particular, the controller may be configured to filter the vibration signal of the vehicle according to driving of the vehicle in order to remove a vibration signal of the vehicle corresponding to a natural frequency of an engine of the vehicle from the vibration signal of the vehicle according to driving of the vehicle detected by the data detector. The controller may be configured to convert the filtered vibration signal into a signal including a sinusoidal wave having a natural frequency of the automatic transmission based on a gear stage of the automatic transmission of the vehicle by using a frequency analysis method. In addition, the controller may be configured to calculate a degradation degree of the damper clutch included in a torque converter of the automatic transmission based on a magnitude of the sinusoidal wave having the natural frequency of the automatic transmission.

The controller may be configured to filter the vibration signal of the vehicle according to driving of the vehicle by using a high pass filter.

The frequency analysis method may include a fast Fourier transform method.

The controller may be configured to display the degradation degree of the damper clutch through a display device.

According to the method and apparatus for calculating a degradation degree of the damper clutch of the automatic transmission of a vehicle, the degradation degree of the damper clutch of a torque converter included in the automatic transmission may be calculated by using a vibration signal of the vehicle according to driving of the vehicle.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

In order to fully understand the present disclosure, and the object achieved by the practice of the present disclosure, reference should be made to the accompanying drawings illustrating an embodiment of the present disclosure.

Hereinafter, some embodiments of the present disclosure are described in detail with reference to the accompanying drawing. In describing the embodiments, when it is determined that a detailed description of the well-known art associated with the present disclosure may obscure the gist of the present disclosure, it has been omitted. The same reference signs presented in each drawing may indicate the same constituent elements.

The terms used herein are used only for the purpose of describing particular exemplary embodiments and are not intended to limit the present disclosure. Singular expressions include plural expressions unless clearly described as different meanings in the context. It should be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

Throughout the present disclosure, when it is described that an element is "coupled" or "connected" to another element, the element may be coupled or connected to the another element directly or indirectly interposing a still another element, or coupled or connected to the another element electrically or mechanically. When a component, device, element, or the like of the present disclosure is described as having a purpose or performing an operation, function, or the like, the component, device, or element should be considered herein as being "configured to" meet that purpose or to perform that operation or function.

Unless otherwise defined herein, all terms including technical or scientific terms used herein have the same meaning as commonly understood by one of ordinary skill in the art to which the present disclosure belongs. Terms such as those defined in a commonly used dictionary should be interpreted as being consistent with the meaning in the context of the related technology, and are not interpreted in an ideal or excessively formal meaning unless explicitly defined in the present specification.

Figure 1:
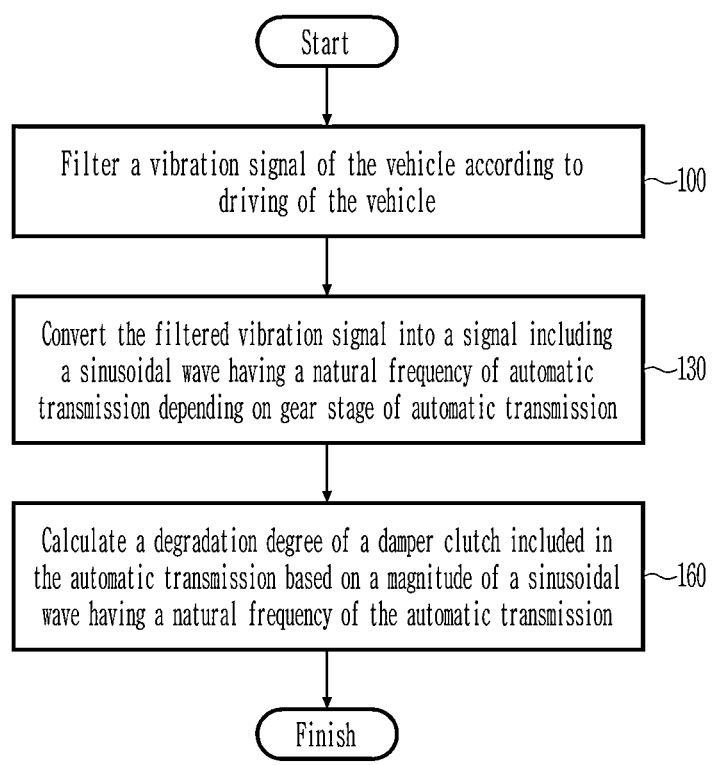
FIG. 1 is a flowchart showing a method for calculating a degradation degree of a damper clutch of an automatic transmission of a vehicle according to an embodiment.
Figure 2:
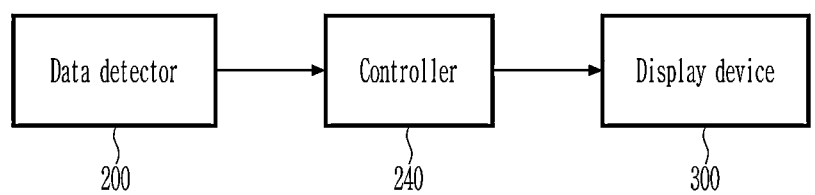
FIG. 2 is a block diagram of an apparatus for calculating a degradation degree of a damper clutch of an automatic transmission of a vehicle to which a method for calculating a degradation degree of a damper clutch of an automatic transmission of a vehicle is applied.

FIG. 1 is a flowchart showing a method for calculating a degradation degree of a damper clutch of an automatic transmission of a vehicle according to an embodiment. FIG. 2 is a block diagram of an apparatus for calculating a degradation degree of a damper clutch of an automatic transmission of a vehicle to which a method for calculating a degradation degree of a damper clutch of an automatic transmission of a vehicle is applied.

Referring to FIG. 1 and FIG. 2, at step S100 of filtering, a controller 240 is configured to filter a vibration signal of the vehicle according to driving of the vehicle in order to remove a vibration signal of the vehicle corresponding to a natural frequency (or judder frequency) of an engine of the vehicle (or a vibration signal of the vehicle due to natural frequency of the engine of the vehicle) from the vibration signal of the vehicle according to driving (i.e., running) of the vehicle. For example, the controller 240 may filter the vibration signal of the vehicle according to driving of the vehicle by using a high pass filter, in order to remove the vibration signal of the vehicle corresponding to the natural frequency of the engine of the vehicle from the vibration signal of the vehicle according to driving of the vehicle.

As shown in FIG. 2, the apparatus for calculating a degradation degree of a damper clutch of an automatic transmission of the vehicle may include a data detector 200 and the controller 240. The automatic transmission is configured to convert the torque of the engine into an appropriate torque based on a vehicle speed, and transmits the converted torque to drive wheels of the vehicle.

The data detector 200 may include a sensor that detects the vibration signal of the vehicle according to driving of the vehicle and provides the detected vibration signal to the controller 240.

The controller 240 may be implemented as an electronic control unit (ECU) that controls an overall operation of the vehicle. For example, the controller 240 may be a hardware (for example, a microcomputer) including at least one microprocessor or the microprocessor operated by a program (control logic), where the program may include a series of instructions for performing a method for calculating a degradation degree of a damper clutch of an automatic transmission of the vehicle according to an embodiment. The instructions may be stored in a memory (not shown) of an apparatus for calculating a degradation degree of a damper clutch of an automatic transmission or the controller 240.

Referring back to FIG. 1, at step S130 of converting, the controller 240 may convert the filtered vibration signal into a signal including a sinusoidal wave having a natural frequency of the automatic transmission based on a gear stage (such as a first gear stage, a second gear stage, a reverse gear stage, and the like) of the automatic transmission, by using a frequency analysis method. For example, the frequency analysis method may include a fast Fourier transform (FFT) method (or a fast Fourier transform algorithm) that converts a time domain signal to a frequency domain signal.

For example, a natural frequency of the automatic transmission corresponding to the first gear stage of the automatic transmission may be 5.5 Hz, and a natural frequency of the automatic transmission corresponding to the third gear stage of the automatic transmission may be 9 Hz.

At step S160, the controller 240 may calculate a degradation degree of a damper clutch (or lock-up clutch) included in a torque converter of the automatic transmission based on a magnitude (or amplitude) of the sinusoidal wave having the natural frequency of the automatic transmission.

The damper clutch directly connects the engine and the automatic transmission. The damper clutch may be installed a front cover of the torque converter and a turbine of the torque converter. The torque converter may rotate the turbine by using a fluid.

When degradation of a friction member included in the damper clutch of the automatic transmission occurs, a signal including the sinusoidal wave having the natural frequency of the automatic transmission may be generated. For example, the degradation degree of the damper clutch may be expressed in a numeric value.

The degradation degree of the damper clutch depending on the magnitude of the sinusoidal wave having the natural frequency of the automatic transmission may be determined by tests (or experiments) in advance and may be stored in the memory. As such, the degradation degree of the damper clutch may be obtained based on the magnitude of the sinusoidal wave having the natural frequency of the automatic transmission by referring to data (e.g., degradation degree test data) stored in the memory. When the magnitude of the sinusoidal wave having the natural frequency of the automatic transmission is large, the degradation degree of the damper clutch may be large.

In an embodiment, the controller 240 may display the degradation degree of the damper clutch through a display device 300 such as a cluster of the vehicle such that a driver of the vehicle may recognize the degradation of the damper clutch. Therefore, the driver of the vehicle may recognize damage or degradation of the automatic transmission.

The constituent elements or "-unit" or "-group" or a block or module used in the embodiment of the present disclosure can be implemented as tasks, classes, subroutines, processes, objects, execution threads, software such as a program, or hardware such as a field-programmable gate array (FPGA) or an application-specific integrated circuit (ASIC), or a combination of the software and hardware. The constituent elements or "-unit" may be included in a computer-readable storage medium, or a part thereof may be dispersed and distributed in a plurality of computers.

As above, the embodiment was disclosed in drawings and the specification. Here, although specific terms have been used, these are only used for the purpose of describing the present disclosure and are not to be used to limit the meaning or range of the present disclosure described in the claims range. Therefore, a person of ordinary skill in this technical field will be able to understand that numerous variations and equivalent embodiments are possible from the present disclosure. Therefore, the true technical protection range of this disclosure should be determined by the technical idea of the appended claims range.

DESCRIPTION OF SYMBOLS

200: data detector
240: controller

What is claimed is:

1. A method for calculating a degradation degree of a damper clutch of an automatic transmission of a vehicle, the method comprising:
    filtering, by a controller, a vibration signal of the vehicle according to driving of the vehicle in order to remove a vibration signal of the vehicle corresponding to a natural frequency of an engine of the vehicle from the vibration signal of the vehicle according to the driving of the vehicle;
    converting, by the controller, the filtered vibration signal into a signal including a sinusoidal wave having a natural frequency of the automatic transmission based on a gear stage of the automatic transmission of the vehicle by using a frequency analysis method; and
    calculating, by the controller, a degradation degree of the damper clutch included in a torque converter of the automatic transmission based on a magnitude of the sinusoidal wave having the natural frequency of the automatic transmission.

2. The method of claim 1, wherein filtering the vibration signal of the vehicle according to driving of the vehicle is performed by a high pass filter.

3. The method of claim 1, wherein the frequency analysis method comprises a fast Fourier transform method.

4. The method of claim 1, further comprising:
    displaying, by the controller, the degradation degree of the damper clutch on a display device.

5. An apparatus for calculating a degradation degree of a damper clutch of an automatic transmission of a vehicle, the apparatus comprising:
    a data detector configured to detect a vibration signal of the vehicle according to driving of the vehicle; and
    a controller configured to filter the vibration signal of the vehicle according to the driving of the vehicle in order to remove a vibration signal of the vehicle corresponding to a natural frequency of an engine of the vehicle from the vibration signal of the vehicle according to the driving of the vehicle detected by the data detector,
    wherein the controller is further configured to:
        convert the filtered vibration signal into a signal including a sinusoidal wave having a natural frequency of the automatic transmission based on a gear stage of the automatic transmission of the vehicle by using a frequency analysis method, and
        calculate a degradation degree of the damper clutch included in a torque converter of the automatic transmission based on a magnitude of the sinusoidal wave having the natural frequency of the automatic transmission.

6. The apparatus of claim 5, wherein the controller is configured to filter the vibration signal of the vehicle according to the driving of the vehicle by using a high pass filter.

7. The apparatus of claim 5, wherein the frequency analysis method includes a fast Fourier transform method.

8. The apparatus of claim 5, wherein the controller is configured to display the degradation degree of the damper clutch on a display device.

* * * * *